US00RE34117E

United States Patent [19]

Martin et al.

[11] E Patent Number: Re. 34,117

[45] Reissued Date of Patent: Oct. 27, 1992

[54] PROTECTIVE LABORATORY SPECIMEN BAG

[75] Inventors: Kenneth W. Martin; Jonathan T. McClure, both of Greenville, S.C.

[73] Assignee: International Plastics, Inc., Greenville, S.C.

[21] Appl. No.: 605,077

[22] Filed: Oct. 25, 1990

Related U.S. Patent Documents

Reissue of:

[64] Patent No.: 4,927,405
Issued: May 22, 1990
Appl. No.: 214,520
Filed: Jul. 1, 1988

[51] Int. Cl.[5] ..... B31B 27/64; B31B 27/14

[52] U.S. Cl. ..... 493/194; 493/197; 493/199; 493/213; 493/214; 493/215; 493/927; 493/931; 383/38; 383/63; 383/65

[58] Field of Search ..... 156/290; 493/194, 197, 493/199, 212-215, 346, 381; 383/38, 63, 65, 87

[56] References Cited

U.S. PATENT DOCUMENTS

| | | | |
|---|---|---|---|
| 2,741,956 | 4/1956 | Diffenbaugh . | |
| 3,510,052 | 5/1970 | Ruda | 383/87 |
| 3,680,768 | 8/1972 | Warren | 229/72 |
| 3,802,919 | 4/1974 | Saffir | 383/38 |
| 4,557,377 | 12/1985 | Maloney | 383/38 |
| 4,637,061 | 1/1987 | Riese | 206/219 |
| 4,672,723 | 6/1987 | Hugues et al. | 383/63 |
| 4,744,673 | 5/1988 | Nakamura | 383/38 |

FOREIGN PATENT DOCUMENTS

| | | | |
|---|---|---|---|
| 2081215 | 2/1982 | United Kingdom | 383/38 |

OTHER PUBLICATIONS

Minigrip brochure—1 page.

*Primary Examiner*—Bruce M. Kisliuk
*Assistant Examiner*—Jack Lavinder
*Attorney, Agent, or Firm*—Cort Flint

[57] ABSTRACT

A composite laboratory specimen bag (A) and method is illustrated which includes folded tubing (D) having a releasable lock (26) for forming a first fluid-tight compartment (B) for containing a laboratory specimen container. J-folded sheeting (E) with a reverse flip (46) forms a second compartment (C) for containing associated paper work. The tubing and sheeting are heat sealed together across a web (32) of the tubing to form a closed top composite bag with side mouth openings (24,48) for the compartments. A protective plate (62) avoids damage to the lock during the heat sealing step.

22 Claims, 2 Drawing Sheets

PROTECTIVE LABORATORY SPECIMEN BAG

Matter enclosed in heavy brackets [ ] appears in the original patent but forms no part of this reissue specification; matter printed in italics indicates the additions made by reissue.

BACKGROUND OF THE INVENTION

The invention relates to a composite bag for packaging a laboratory specimen container and associated paper work in a manner to protect against infection from the specimen during handling and against misplacement of the paper work.

Health care and lab workers have become increasingly cautious with regards to handling specimen containers due to the possibility of contacting infectious diseases such as AIDS (Acquired immunodeficiency syndrome) from container leaks. It has also become increasingly important to keep accurate records and association of the paper work with the specimen.

It is known to make a bag having a first pocket for a lab specimen with a zipper closure and a second pocket for paper work. The first compartment retains leaks. However, the first and second pocket are joined together only at the sides leaving a gap open on both ends between the pockets. Since the second pocket has an open mouth, the paper work can easily be placed mistakenly in the gap where it easily slides out the open end becoming misplaced or lost. Plastic bags of general interest are shown in U.S. Pat. No. 4,637,061 disclosing a plastic bag for transporting a specimen in a leak-proof manner; and U.S. Pat. No. 3,680,768 disclosing a plastic bag and method having plural compartments.

Accordingly, an object of the invention is to provide a plastic bag for packaging a lab specimen in a leak-proof manner and the associated paper work in a secure manner for reliable processing with the specimen.

Another object of the invention is to provide a composite bag having a first leak-proof compartment for packaging a lab specimen and a second compartment for packaging associated paper work with reliable closures for both compartments to insure against loss of the packaged contents.

Another objective of the invention is to provide a unitary plastic bag having dual compartments for packaging a lab specimen and associated paper work having increased structural integrity.

SUMMARY OF THE INVENTION

The above objectives are accomplished according to the invention by providing a unitary specimen bag for packaging a laboratory specimen container and associated paper work which comprises a first generally fluid-tight compartment defined by first and second opposing side walls and a folded bottom edge. The side walls terminate in a pair of free edges defining a first compartment mouth for receiving the specimen container. A resealable lock includes first and second linear mating portions carried by the free edges of the respective first and second side walls for sealing the compartment in a fluid-tight manner. A web of the tubing extends above said second linear mating portion and generally across the second side wall. A second compartment defined by third and fourth side walls has joined together edges and a folded bottom edge. At least the third wall of the second compartment is joined across an upper portion to the web above the releasable lock of the first compartment. The fourth side wall of the second compartment terminates at a free edge to define a second compartment mouth for receiving paper work. Further in accordance with the invention a method for producing a unitary specimen bag is disclosed which includes supplying plastic folded tubing having first and second side walls; and supplying plastic folded sheeting having third and fourth side walls. Feeding of the folded tubing and sheeting in carried out in a superposed manner to a heat sealer. The method includes feeing the tubing with a releasable lock carried by the first and second walls faced downwards and the sheeting with a reverse flip faced upwards so that the second, third, and fourth side walls are heat sealed together to form a closed top composite bag wherein a mouth to the second compartment is formed on a side of the composite structure. The method includes forming a plurality of spaced second heat seals on the superposed tubing and sheeting transverse to the first heat seal and severing the superposed, heat sealed tubing and sheeting to form individual bags.

DESCRIPTION OF THE DRAWINGS

The construction designed to carry out the invention will hereinafter be described, together with other features thereof. The invention will be more readily understood from a reading of the following specifications and by reference to the accompanying drawings forming a part thereof, wherein an example of the invention is shown and wherein.

DESCRIPTION OF A PREFERRED EMBODIMENT

Figure 1:
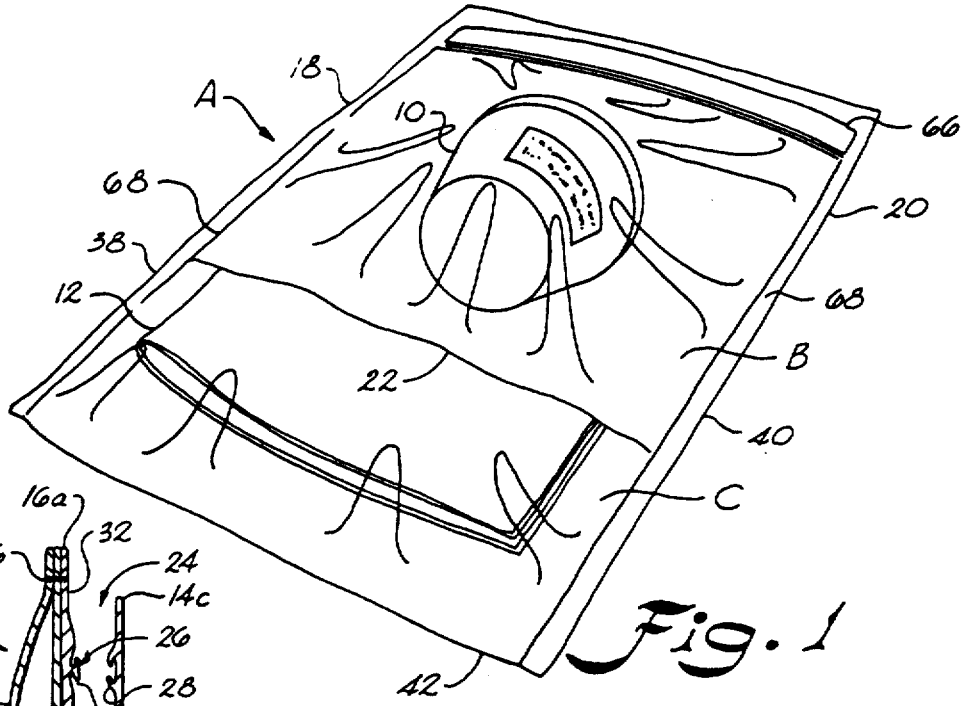
FIG. 1 is a perspective view of a protective laboratory specimen bag according to the invention.
Figure 2:
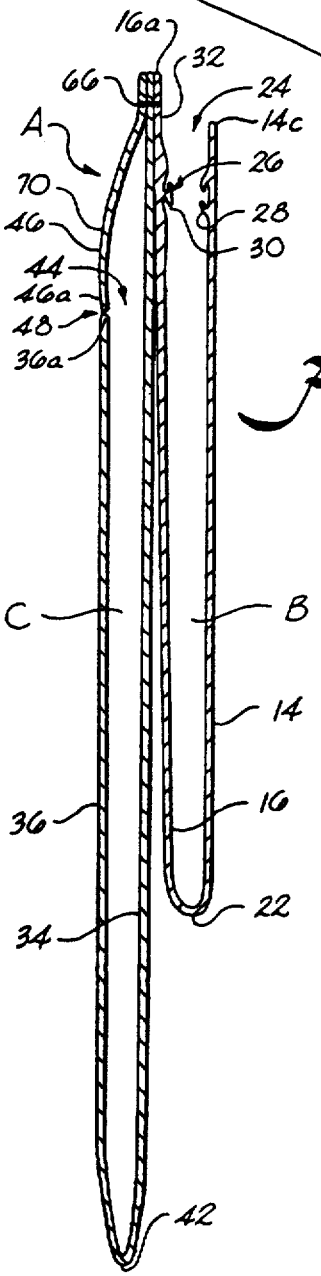
FIG. 2 is a longitudinal sectional view of a protective laboratory specimen bag according to the invention.
Figure 3:
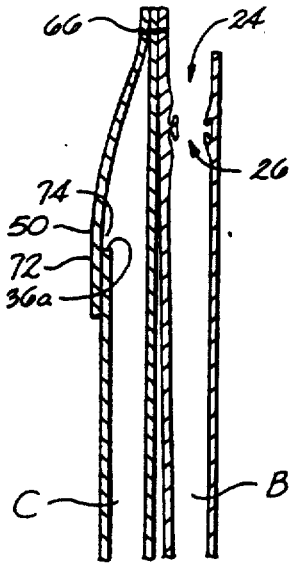
FIG. 3 is a partial longitudinal sectional view of another embodiment of a protective laboratory specimen bag according to the invention.
Figure 4:
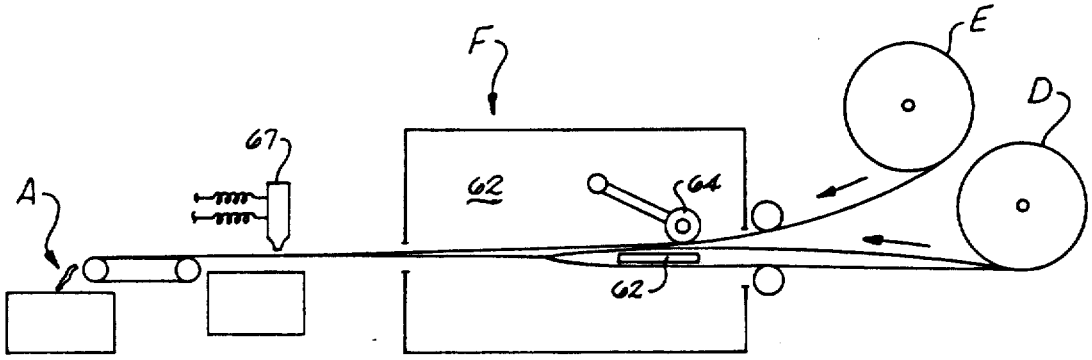
FIG. 4 is a schematic illustration of a method for making a protective laboratory specimen bag according to the invention.
Figure 5:
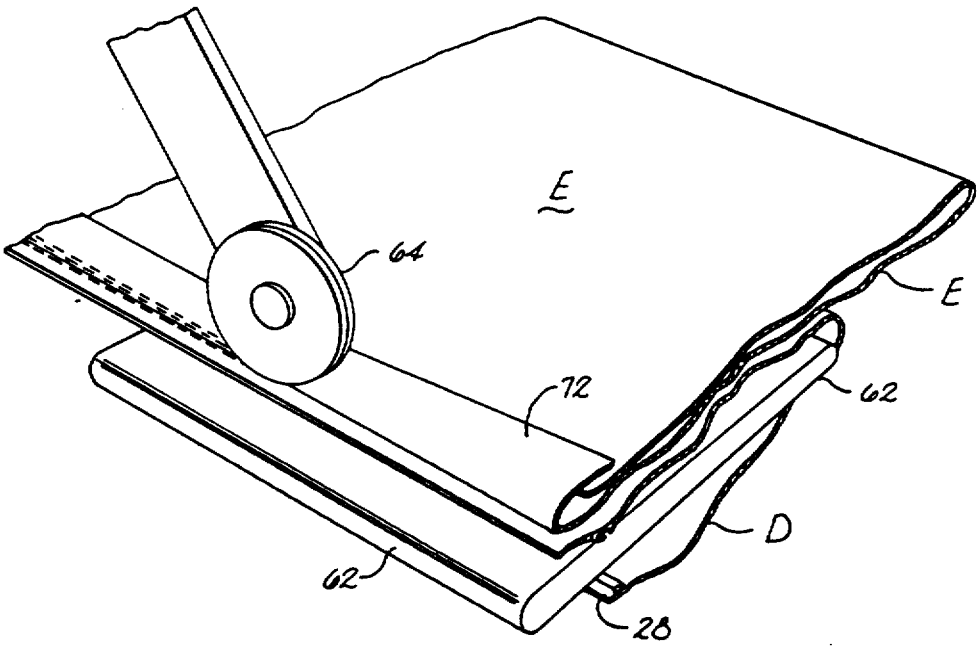
FIG. 5 is a perspective view illustrating a method of making a protective laboratory specimen bag according to the invention.

A unitary specimen bag, designated generally as A, is disclosed for packaging a laboratory specimen container 10 and associated paper work 12 which comprises a first generally fluid-tight compartment B defined by first and second opposing side walls 14 and 16 made integral by joined together side edges 18 and 20, and a folded bottom edge 22. Side walls 14 and 16 terminate in a pair of free edges **14*a* and 16*a* defining a first compartment mouth 24 for receiving specimen container 10. A resealable lock means, designated generally as 26, has first and second linear mating portions 28, 30 carried near free edges 14*a*, 16*a* of the respective first and second side walls for sealing said compartment in a leak-proof manner. The lock is preferably the type referred to as a zipper lock such as disclosed in U.S. Pat. No. 4,672,723. A web 32 extends above second linear mating portion 30 and generally across second side wall 16. A second compartment C is defined by third and fourth side walls 34, 36 having joined together edges 38, 40 and a folded bottom edge 42. At least third wall 34 of second compartment is joined across an upper portion to web 32 above releasable lock means 26 of first compartment B. Fourth side wall 36 of second compartment C terminates at a free edge 36***a* to define a second compartment mouth 44 for receiving paper work 12.

A flap 46 is joined with third side wall 34 of second compartment C across web 32, and the flap has a free edge 46*a* which terminates at edge 36*a* of fourth wall 36 to define a narrow slit opening 48 for mouth 44. In this case, compartment C may be produced from J-folded sheeting with a reverse flip. Alternatively, closure means for mouth 44 may be in the form of a flap 50 which extends over free edge 36*a* of fourth side wall 36 and second compartment mouth 48 for closing mouth and second compartment. In this case, compartment C may be made form J-folded sheeting with a reverse flip and a recessed lip. Edges 18, 20 of the first and second side walls and the edges 38, 40 of the third and fourth side walls are joined together by heat sealing.

In accordance with the invention, a method is disclosed for producing a unitary specimen bag A for packaging the laboratory specimen container and associated paper work which includes supplying folded tubing D having first and second side walls 14, 16 with a fluid-tight closure 26 having first and second linear mating portions 28, 30 carried respectively by the first and second side walls. Folded tubing D is preferably supplied with web 32 extending above the first and second linear mating portions. Next, J-folded sheeting E is supplied having third and fourth opposing side walls 34, 36 on either side of fold 42.

The folded tubing and the J-folded sheeting are fed in a superposed manner to a heat sealing means designated generally as F which preferably is a conventional rotary heat seal machine 60 having a plate 62 opposing a rotary heat element 64 in lieu of a second roller. An upper heat seal 66 is found across an upper portion of J-folded sheeting E and web 32 of folded tubing D joining the sheeting and tubing together. Heat sealing means F also includes a conventional reciprocating bar sealer 67 which forms spaced transverse 68 heat seals at spaced intervals along the length of the composite superposed folded tubing D and J-folded sheeting E transverse to upper heat seal 66 joining the tubing and sheeting together at spaced intervals to define first compartment B consisting of first and second side walls 14, 16 joined together and second compartment B consisting of said third and fourth side walls 34, 36 joined together.

Bar sealer 66 forms the heat seal and severs the compartment of folded tubing and said J-folded sheeting along spaced transverse heat seals 68 to produce individual unitary specimen bags A wherein first compartment B contains specimen container 10 in a fluid-tight manner and second compartment C contains said paper work 12. Heat protective plate 62 is inserted between first and second side walls 14, 16 of said folded tubing while upper heat seal 66 is being formed to prevent damage to the zipper closure 26 and resultant leakage and to prevent any incident of heat sealing of walls 14 and 16. For example, upper heat seal 66 may be formed at or below linear zipper closure 26.

In the method the J-folded sheeting is supplied in a form having a reverse sheeting flip 70 providing narrow slit mouth opening 48 for second compartment C.

Alternately, J-folded sheeting E is supplied in a form having a reverse sheeting flip 72 with a recessed lip 74 so that said sheeting flip extends past a free end 36*a* of said fourth side wall providing a recessed mouth opening 76 for second compartment C. Web 32 extends across second wall 16 of first compartment B. Second wall 16 of first compartment B and third wall 34 of second compartment B are joined together by upper seal 66 providing a double wall between interiors of the first and second compartments.

Thus, it can be seen that an advantageous construction can be had according to the invention for guarding an infective lab specimen and associated paper work. Composite protective laboratory specimen bag A and includes folded tubing D having a releasable lock 26 for forming a first fluid-tight compartment B for containing a laboratory specimen container. J-folded sheeting E with a reverse flip 46 forms a second compartment C for containing associated paper work. The tubing and sheeting are heat sealed together across web 32 of the tubing to form a closed top composite bag with side mouth openings 24, 48 for the compartments which may be positively located for article placement avoiding misplacement of articles.

While a preferred embodiment of the invention has been described using specific terms, such description is for illustrative purposes only, and it is to be understood that changes and variations may be made without departing from the spirit or scope of the following claims.

What is claimed is:

1. A method for producing a unitary specimen bag for packaging a laboratory specimen container and associated paper work comprising:

supplying folded tubing having first and second side walls with a fluid-tight closure having first and second linear mating portions carried respectively by said first and second side walls wherein said second side wall comprises a web portion[;]

extending above said first and second linear mating portions;

supplying J-folded sheeting having third and fourth opposing side walls on either side of a fold;

feeding said folded tubing and said J-folded sheeting in a superposed manner to heat sealing means;

forming an upper heat seal across an upper portion of said J-folded sheeting and said web portion of said folded tubing spaced from and generally parallel to said first and second linear mating surfaces joining said sheeting and web together;

forming spaced transverse heat seals at spaced intervals along the length of said superposed folded tubing and J-folded sheeting transverse to said upper heat seal joining said tubing and sheeting together at said spaced intervals to define a first compartment consisting of said first and second side walls joined together and a second compartment consisting of said third and fourth side walls joined together; and severing said folded tubing and said J-folded sheeting along said spaced transverse heat seals to produce individual specimen bags wherein said first compartment contains said specimen container in a fluid-tight manner and said second compartment contains said paper work.

2. The method of claim 1 including inserting a heat protective plate between said first and second side walls of said folded tubing while *the* upper heat seal is being formed.

3. The method of claim 1 wherein said J-folded sheeting is supplied in a form which includes a reverse sheeting flip providing a narrow slit mouth opening for said second compartment.

4. The method of claim 1 wherein said J-folded sheeting is supplied in a form having a reverse sheeting flip with a recessed lip so that said sheeting flip extends past a free end of said fourth side wall providing a recessed mouth opening for said second compartment.

5. The method of claim 1 wherein said web portion extends across said second wall of said first compartment; said second wall of said first compartment and said third wall of said second compartment being joined together by said upper seal providing a double wall between interiors of said first and second compartments.

6. A method for producing a unitary specimen bag for packaging a laboratory specimen container and associated paper work comprising:

supplying plastic folded tubing having first and second side walls with a resealable lock having opposed linear mating portions carried by said first and second side walls;

supplying plastic folded sheeting having a third side wall and a fourth side wall which includes a reverse flip;

feeding said folded tubing and sheeting in a superposed manner to heat seal means;

forming a first heat seal across said second, third, and fourth side walls of said superposed sheeting and tubing;

forming a plurality of spaced second heat seals on said superposed sheeting and tubing transverse to said first heat seal to form a first compartment between said first and second side walls and a second compartment between said third and fourth side walls; and forming said first heat seal in such a manner to form a closed top composite bag with said reverse flip forming a side mouth opening for said second compartment.

7. The method of claim 6 including inserting a heat protective plate between said first and second side walls of said folded tubing while first heat seal is being formed.

8. The method of claim 6 including feeding said tubing with said resealable lock facing downwards and said reverse flip of said sheeting facing upwards.

9. The method of claim 6 wherein said folded sheeting is supplied in a form having a reverse sheeting flip with a recessed lip so that said sheeting flip extends past a free end of said fourth side wall providing a recessed mouth opening for said second compartment.

10. The method of claim 6 wherein said tubing is supplied in a form having a web which extends across said second wall of said first compartment; said second wall of said first compartment and said third wall of said second compartment being joined together by said seal providing a double wall between interiors of said first and second compartments.

11. The method of claim 6 including forming said first heat seal on said [second] sidewall above said second linear mating portion of said releasable lock.

*12. A method for producing a unitary specimen bag having first and second generally side-by-side compartments for packaging a laboratory specimen container and associated paper work, respectively, comprising:*

*supplying folded tubing for forming said first compartment including first and second side walls with a fluid-tight closure having first and second linear mating portions carried respectively substantially adjacent upper edges of said first and second side walls wherein said second side wall comprises a web portion extending above said first and second linear mating portions;*

*supplying separate sheeting providing third and fourth side walls and forming said second compartment at a side of said first compartment;*

*feeding said folded tubing and said sheeting in a prearranged generally side-by-side manner to heat sealing means;*

*forming an upper heat seal across an upper portion of said sheeting and said web portion of said folded tubing spaced above and generally parallel to said first and second linear mating surfaces joining said sheeting and web portion together;*

*forming spaced substantially transverse heat seals at spaced intervals along the length of said folded tubing and sheeting transverse to said upper heat seal joining said tubing and sheeting together at said spaced intervals to define said first compartment consisting of said first and second side walls joined together and said second compartment which includes said third and fourth side wall; and*

*severing said folded tubing and said sheeting along said spaced transverse heat seals to produce individual specimen bags wherein said first compartment is adapted to receive said specimen container in a fluid-tight manner and said second compartment is adapted to receive said paper work.*

*13. The method of claim 12 including inserting a heat protective plate between said first and second side walls of said folded tubing while said upper heat seal is being formed.*

*14. The method of claim 12 wherein said sheeting is supplied to define a reverse flap providing a narrow slit mouth opening for said second compartment.*

*15. The method of claim 12 wherein said sheeting is supplied to define a flap that extends past a free end of said fourth side wall providing a recessed mouth opening for said second compartment.*

*16. The method of claim 12 wherein said web portion extends across said second wall of said first compartment; said second wall of said first compartment and said third side wall of said second compartment being joined together by said upper seal providing a double wall between interiors of said first and second compartment.*

*17. A method for producing a unitary specimen bag having first and second generally side-by-side compartments for packaging a laboratory specimen container and associated paper work comprising:*

*supplying first and second plastic side walls for forming said first compartment with a fluid-tight closure having opposed linear mating portions carried by said first and second side walls to define said first compartment and a first bag opening said first bag opening being formed along one of said first and second side walls;*

*supplying sheeting to provide third and fourth side walls and forming said second compartment at a side of said first compartment having a second bag opening on a side of said specimen bag opposite said first bag opening;*

*feeding said side walls in a prearranged relation to a thermal sealing means;*

*forming a first seal across a plurality of said side walls along a line spaced from and generally parallel to said linear mating portion of said fluid-tight closure on said second side wall; and*

*forming a plurality of second seals between said side walls substantially transverse to said first seal to form said first compartment which includes said first bag opening for receiving and containing said specimen container in said fluid-tight manner, and to form said*

*second compartment which is disposed next to a side of said first compartment and includes said second bag opening for receiving and containing said associated paper work.*

*18. The method of claim 17 including inserting a heat protective plate between said first and second side walls of said folded tubing while said first heat seal is being formed.*

*19. The method of claim 17 wherein said third side wall is supplied to define a reverse flap and a narrow slit mouth opening for said second compartment.*

*20. The method of claim 17 wherein said third side wall is supplied to define a reverse flap extending past a free end of said fourth side wall providing a recessed mouth opening for said second compartment.*

*21. The method of claim 17 wherein said first seal extends across said second wall of said first compartment; said second wall of said first compartment and said third side wall of said second compartment being joined together by said upper seal providing a double wall between interiors of said first and second compartment.*

*22. A method for making a composite protective laboratory specimen bag having first and second generally side-by-side compartments for containing a laboratory specimen container and related paper work comprising:*

*forming a first compartment from plastic side walls for containing a lab specimen container in a leak-proof manner on a first side of said composite bag having a first bag opening wherein said side walls have a resealable closure with opposing linear mating portions carried by said side walls for sealing said first compartment in said leak-proof manner;*

*forming a second compartment from plastic side walls along a second side of said composite bag for containing said related paper work having a second bag opening on said second side of said composite bag opposite said first side;*

*forming a transverse heat seal along certain ones of said side walls of said first and second compartments near an upper portion of said composite bag generally parallel and spaced from said linear mating portions of said resealable closure to join said first and second compartments together and close said composite bag from a top portion thereof so that entrance to said bag is had only at said first and second bag openings; and*

*forming a pair of side heat seals extending generally perpendicular to said transverse heat seal sealing side edges of said first and second compartments.*

* * * * *